June 1, 1965        O. GÜPNER        3,186,933

APPARATUS FOR THE ELECTRIC SEPARATION OF EMULSIONS

Filed March 20, 1961        5 Sheets-Sheet 1

INVENTOR

Otto Güpner

BY Bailey, Stephens and Huettig
ATTORNEYS

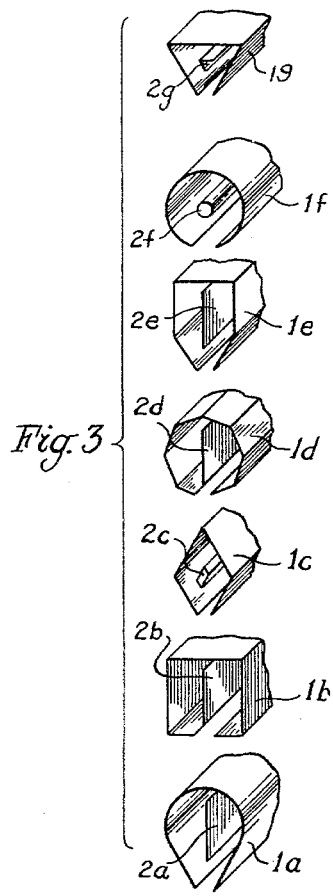
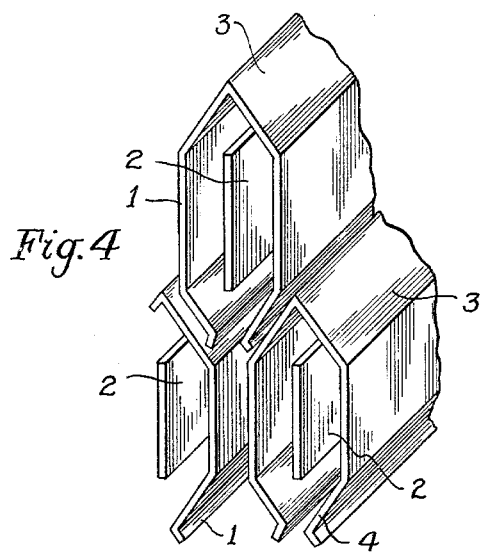
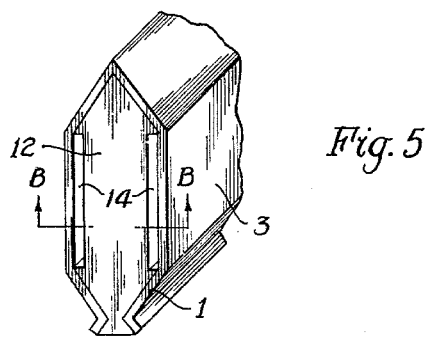
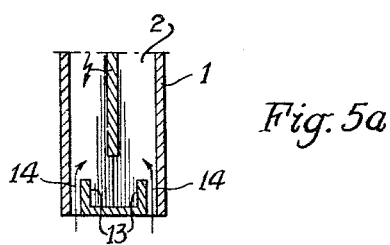

June 1, 1965   O. GÜPNER   3,186,933
APPARATUS FOR THE ELECTRIC SEPARATION OF EMULSIONS
Filed March 20, 1961   5 Sheets-Sheet 4
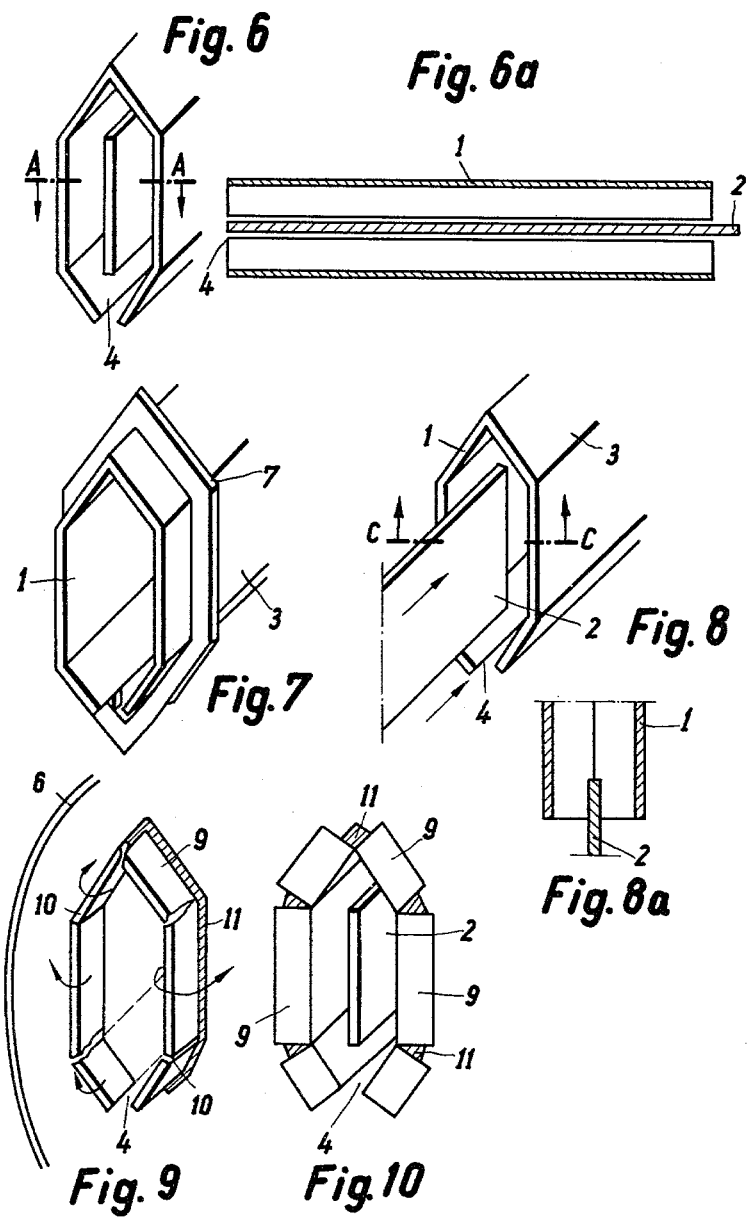
Inventor:
Otto Gupner

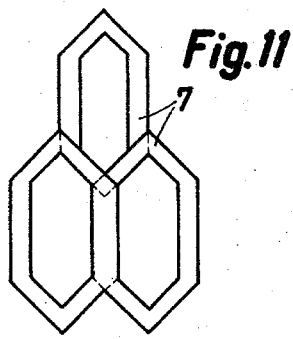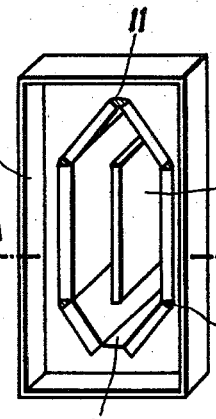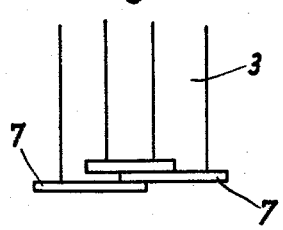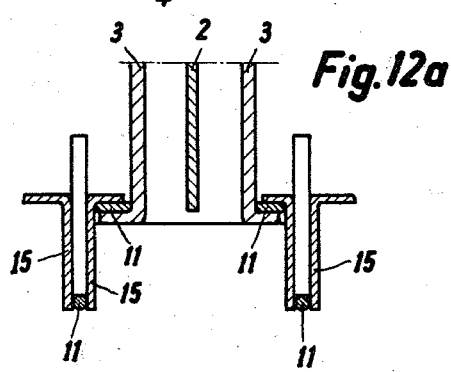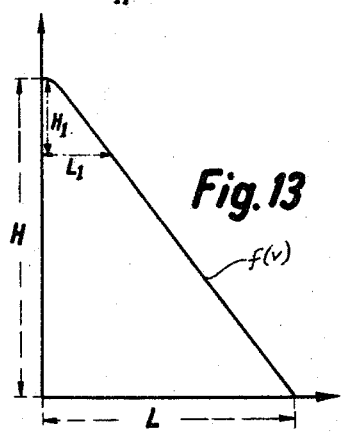

United States Patent Office 3,186,933
Patented June 1, 1965

1

3,186,933
APPARATUS FOR THE ELECTRIC SEPARATION OF EMULSIONS
Otto Güpner, Offenbach am Main, Germany, assignor to Metallgesellschaft Aktiengesellschaft, Frankfurt am Main, Germany
Filed Mar. 20, 1961, Ser. No. 96,897
Claims priority, application Germany, Apr. 7, 1960, M 44,917
7 Claims. (Cl. 204—302)

This invention is directed to the separation or breaking of emulsions and, in particular, is directed to the apparatus for the electrical breaking of emulsions.

The object of this invention is to improve upon a type of electrical emulsion separator such as shown in U.S. Patent No. 2,681,311 to De Wit. The apparatus disclosed in this patent is divided into three zones, namely a pretreatment zone, a separation zone, and an after-treatment zone, the latter being a second treatment zone, and all three zones being housed in a cylindrical container. Such an apparatus is used, for example, to de-salt mineral oil. In such case, the pretreatment and after treatment zones are subject to a high voltage current, and it does not matter whether the zones are in a single container or arranged in three separate containers connected to each other by pipes. The separating electrodes in the pretreatment and after-treatment zones are primarily composed of horizontal or vertical parallel plates which either are connected to the two poles of a high voltage current condenser, or grounded, or between which there flows an alternating current. The electrodes, in effect, constitute a condenser through which flows the emulsion which is to be separated. The water in the emulsion forms into droplets under the force of the electric field and these drop into the lower portion of the container. The use of condenser electrodes presupposes that the unseparated emulsion has a high electrical resistance, and therefor the distance between the electrodes is so selected as to prevent the formation of a stream of water or lye droplets which would lower the electrical resistance between the condenser plates.

Following the initial pretreatment zone is the separation zone wherein the water droplets have an opportunity to separate from the oil outside of the influence of the electrical field. The path taken by a separated droplet primarily depends upon the velocity of the stream of the emulsion in the container and the velocity of the fall of the droplet. The result is the summation of the two vectors and shows the droplet path to be a straight line. The velocity of the droplet fall is calculated according to the Stokes' formula and is dependent upon the square of the diameter of the drop and the difference of the two specific weights as, for example, a water in a hydrocarbon phase and vice versa, proportional to the viscosity of the hydrocarbon in water phase. Since a water droplet which is to be separated from the emulsion can only be regarded as being separated when it enters a current-free zone, the necessary dwell or precipitation time and the diameter of the container are then smaller as the lesser the height of the droplet fall in obtaining the same purity of the end product. Consequently, a container having a given diameter can have its length and volume reduced if the height of the fall of the droplet is lessened and still give an equal saturation and purity of the final product by special means.

A zone of a maximum concentration of the droplets which are to be separated is created in areas which are not affected by the current. This again is reduced depending upon the height of the droplet fall.

A decrease in the height of the droplet fall by use of horizontally or slightly inclined metal sheets is old. But metal sheets have the disadvantage in that the deposits formed do not flow off easily, thereby decreasing the free cross-section which, in turn, forces an increase in the velocity of the emulsion flow and a decrease in precipitation time which diminishes the effectiveness of the apparatus. A corresponding increase in the inclination of the metal sheets in or opposite to the direction of the flow of the emulsion which makes possible an independent flow of the deposited water and muck and so forth, however, increases the height of the droplet fall and the precipitation time and therefor requires an increase in the volume of the container. In an apparatus in which the precipitating drops fall vertically across the direction of the emulsion stream, it is also apparent that for equal performance, the volume of the container must be greater than in the previously mentioned apparatus, inasmuch as the separator surface is essentially important for the separation.

This invention is based on the feature of having a new arrangement for the separating bodies in the apparatus which give a greater performance in less space. In this invention, a known separator apparatus is modified in that the individual pretreatment and after-treatment zones are housed in one or more horizontally positioned pressure containers. The interior of the container is divided by prismatic hollow bodies which are wetted by the emulsion and which have the central longitudinal axis parallel to the longitudinal axis of the container. These bodies are open on their lower base side so that the separated heavy fluid can flow into areas free of current and beneath the hollow bodies. A prismatic body is one which, in a purely mathematical sense, has a surface generated by a moving straight line which continuously intersects a given polygon and is parallel to a fixed straight line not in the plane of the polygon.

The means by which the objects of the invention are obtained are described more fully with reference to the accompanying drawings, in which:

FIGURE 3 shows seven modified forms of the prismatic bodies combined with centrally positioned high voltage electrodes;

FIGURE 4 is an enlarged view of a portion of FIGURE 2a;

FIGURE 5 is a perspective view of a modified end of the prismatic body of FIGURE 4;

FIGURE 5a is a cross-sectional view taken on the line B—B of FIGURE 5 and showing a restricted opening into the hollow body to throttle the entering emulsion for the uniform distribution of the liquid in the body and preferably usable in the pretreatment zone or at the entrance to the after-treatment zone of FIGURE 2a;

FIGURE 6 is a perspective view of a single prismatic body with a high voltage electrode therein;

FIGURE 6a is a cross-sectional view taken on the line A—A of FIGURE 6;

FIGURE 7 is a perspective view showing a spacer flange collar on the end of the prismatic body;

FIGURE 8 is a perspective view of a prismatic body adapted to extend from the pretreatment zone entirely through the separation zone and in which the centrally positioned high voltage electrode in the pretreatment zone is shortened in order to form a longer separation zone;

FIGURE 8a is a cross-sectional view taken on the line C—C of FIGURE 8;

FIGURE 9 is a schematic view showing the cut end of a prismatic body positioned in an opening in a body spacing sheet or wall;

FIGURE 10 is a view similar to FIGURE 9 but showing the cut end bent back against the wall;

FIGURE 11 is a schematic view showing a pile of hollow bodies having the flanged collars of FIGURE 7;

FIGURE 11a is a plan view of FIGURE 11;

FIGURE 12 is a perspective view showing an end of a prismatic body mounted in a rectangular frame;

FIGURE 12a is a view taken on the line D—D of FIGURE 12; and

FIGURE 13 is a graph showing the straight line path of a droplet falling out of a separated emulsion as a function of the length and height of the separator zone having given stream and falling velocities.

Figure 1:
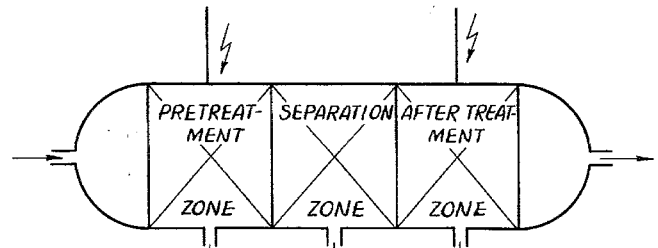
FIGURE 1 is a schematic view of an electrostatic separator having pretreatment, separation and after-treatment zones housed in one pressure container.
Figure 2:
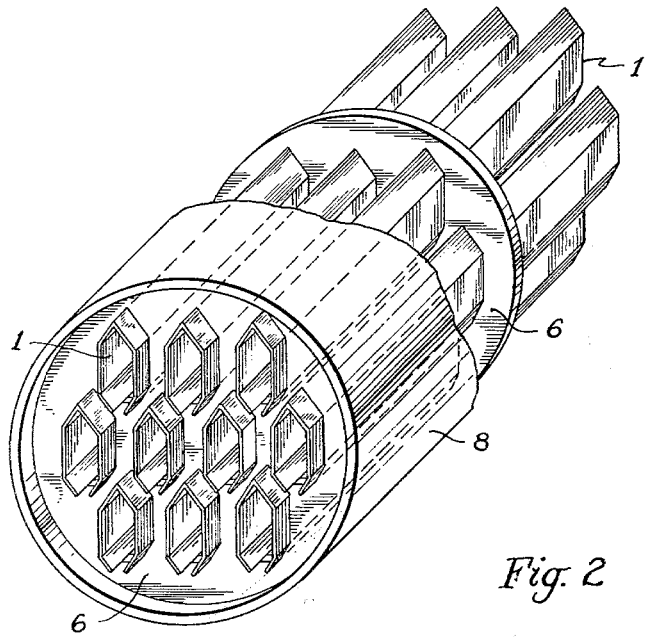
FIGURE 2 is a perspective view of a separator according to this invention containing the prismatic bodies in the separation zone.
Figure 2A:
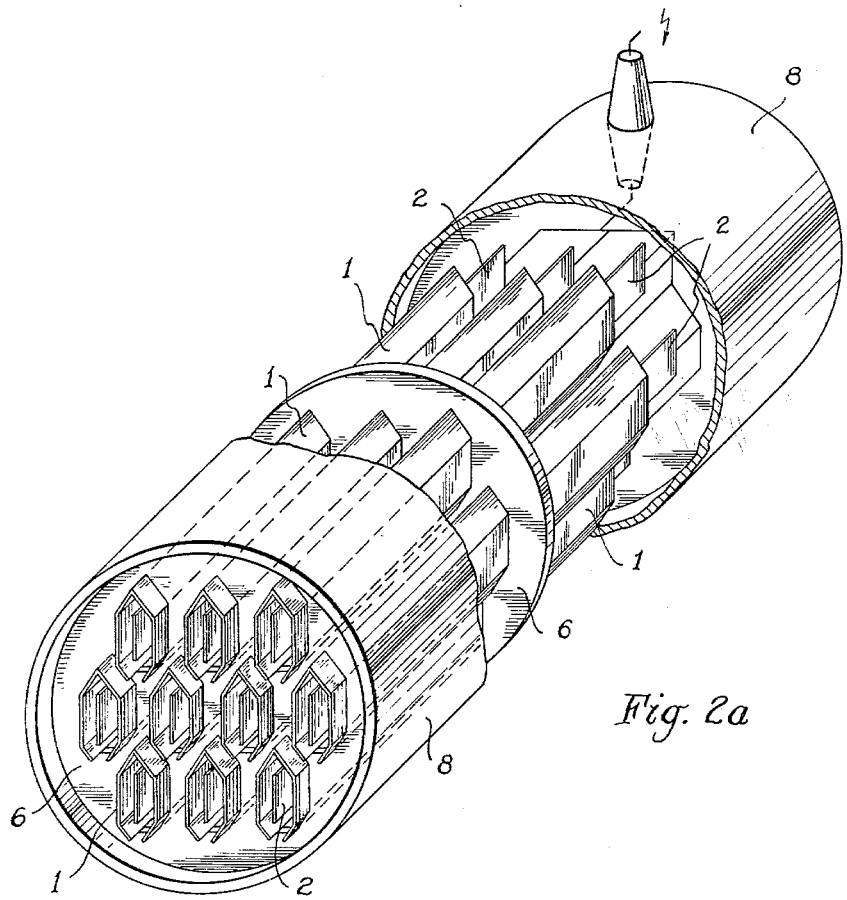
FIGURE 2a is a perspective view showing high voltage electrodes mounted in the center of the prismatic bodies and connected to a high voltage line, and which can be used alone or as the after-treatment zone.

As shown in FIGURE 1, the electrostatic emulsion separator apparatus is divided into three zones within a container, namely, the pretreatment zone, the separation zone, and the after-treatment zone. These zones, as shown in FIGURES 2 and 2a, are filled with prismatic separator bodies 1. In general, each body has the shape of a hollow tube having a longitudinal slot forming an opening in the bottom of the tube. Each body, as shown in FIGURES 4 and 5, has a high voltage electrode 2 positioned centrally within the body. The bodies can take various cross-sectional shapes, as shown by the bodies 1a to 1g in FIGURE 3, each of these bodies having a centrally located electrode 2a to 2g, respectively. Each body 1 has an outer surface 3, and each body has one or more openings 4 in its lower base surface so that separated droplets can fall out of the bottom of the body. These openings are formed either by not closing the lower side of the hollow body or by cutting a series of holes in the lower base surface. The bodies 1 are held in staggered horizontal and vertical rows by means of spacer means such as the spacer sheets 6 as shown in FIGURES 2 and 2a or by means of flange collars 7 as shown in FIGURE 7, the rows being horizontally disposed within the container 8 and held there in exact position. The spacer sheets 6 conform to the inner shape of the container and may be either circular or otherwise shaped and serve to form current-free spaces between the individual prismatic bodies 1 as compared to the flow of the emulsion through the interior of the bodies 1. In FIGURES 2 and 2a, the prismatic bodies are shown extending through openings in spacer sheets 6 and welded thereto. However, as shown in FIGURES 9 and 10, the end portions 9 of bodies 1 protruded through openings in sheets 6 can be cut at the corners 10 so that the cut portions can be bent outwardly as indicated by the arrow in FIGURE 9 and hammered back against a leaded sealing cord 11, as shown in FIGURE 10, so as to be leaded in place.

Instead of using spacer sheets 6, each prismatic body 1 can be formed with a flange collar 7, as shown in FIGURE 7, and the thus flanged bodies can then be piled up as shown in FIGURES 11 and 11a. Moreover, as shown in FIGURES 12 and 12a, the ends of the bodies 1 can be mounted in a rectangular spacer sheet 15, and an assembled bundle of spacer sheets then inserted into a container 8. When this is done, additional means is employed to tighten and close the spacer sheets with the wall of the container, as indicated in FIGURE 12a.

The prismatic hollow bodies 1 employed in the pretreatment zone of the apparatus are equipped so that the precipitating time of the emulsion is short in this zone where there is a high concentration of the emulsion which is spread over the whole cross-section of the container. This is done, as shown in FIGURES 5 and 5a, by a flat sheet closure 12 having inward bent flanges 13 inserted in the end of the hollow body so that there remain only narrow inlet entrance slotted openings 14. These openings 14 serve to direct the stream of emulsion in an even flow through the hollow body 1. If a single prismatic body 1 extends through both the pretreatment and the separation zone, advantageously the centrally positioned high voltage electrode 2 is inserted only a short distance into the pretreatment end of the hollow body, as shown in FIGURES 8 and 8a. Consequently, the entering emulsion is exposed but a short time to the electric field existing between the electrode 2 and the wall 3 of the hollow body.

In the separation zone, the prismatic bodies 1 are not provided with a centrally positioned electrode as is shown in FIGURES 2 and 7. In the after-treatment zone, the arrangement of FIGURE 2a is preferably used, the details of which are shown in FIGURES 4, 6 and 6a. In this after-treatment zone, the centrally positioned electrodes are co-extensive with the prismatic bodies.

When the prismatic bodies are piled, as shown in FIGURES 11 and 11a, they create a very densely packed arrangement of the bodies by reason of the contact of the flanged collars 7 with the body surfaces 3. The current-free space between the bodies is thus relatively small and is useful for the refined cleaning of an emulsion with a correspondingly diminished amount of dispersed media.

The graph of FIGURE 13 shows the line $f(v)$ illustrating the precipitation of the droplet from the emulsion. Ordinate H is the height of the fall of the droplet. The inclination of straight line $f(v)$ is dependent upon the velocities of the entering emulsion stream and the height of fall. The abscissa L indicates the length of the path that the emulsion must travel before a particle falls from a height H into the current-free space. This distance L is proportional to the precipitation or settling out time of the droplet. When the height of the fall H is compared with the diameter of the separation zone or with the separating height of the droplets formed in the separating zone, it is possible to determine the length of the separation zone if the length L is taken into consideration. It is thus apparent that if the height of fall is decreased to $H_1$, then the length L is reduced to $L_1$. This means that when this relation is used in diminishing the separation zone for the separation of a particular emulsion, the separation zone can be given a less length without decreasing its output.

The prismatic hollow bodies of this invention make it possible to have a horizontal flow of the emulsion stream and to assemble several pretreatment sections one above the other because the droplets which are formed during the pretreatment are falling into current-free spaces after leaving the openings 4 on the undersides of the prismatic bodies and therefor cannot affect the underneath pretreatment bodies by causing a higher concentration of released droplets and a possible chain formation of droplets. Also, the maximum concentration of the droplets is lower because of the shorter distance of fall of the droplets within the individual pretreatment prismatic bodies. This distance is about 15 to 50 cm. or more in an industrial apparatus as compared to a conventional apparatus, and makes it possible to use a longer precipitation time without disturbing the electrical field. For this reason, it is possible to keep lower tension distances, as, for example, 5 to 50 mm., so that with an equal strength of the field, as, for example, beginning with about 2.0 kv./cm. in exceptional cases, less tension and therefor a less expensive high voltage apparatus is needed The droplets are of smaller diameter and therefor have a less velocity of fall in the separation or after-treatment zones and can be of such a low density, for example, less than 0.2% of the volume, that for the most refined cleaning up to the complete separation of the dispersed phase, a correspondingly longer precipitation time in the electrical field becomes necessary. Since the same principle holds true for the height of the fall of the droplet in this case, this invention uses for the after-treatment zone the long prismatic hollow bodies with the centrally positioned electrodes extending entirely through the body.

The spacer sheets 6 can be distributed over the whole length of the prismatic hollow bodies instead of just at the beginning and ends of the bodies for the purpose of giving stability to the assembly as well as for establishing the desired electrical field. As such, they form further separating walls or further spacer sheets closed throughout the whole cross-section of the container.

This invention contemplates other combinations, as, for example, subdividing only the separation and after-treatment zones with the prismatic hollow bodies. Again, different combination groups are possible which can be connected in parallel or in series and which have different functions in a given process or in independent processes. For example, there is a combination of a multi-step lye and water cleaning of crude oil for the removal of certain sulphuric components.

Another advantage of the invention lies in the fact that the output of the apparatus with an equal or greater degree of cleaning can be increased by the additional installation of the prismatic hollow bodies of this invention in an existing apparatus. The precipitation time within a single prismatic body, with its unchanged cross-section, can be varied by shortening or lengthening the body. Since a single body element represents a separator as such, the performance of that body can be projected into a large apparatus having a plurality of such bodies so that the design of a large apparatus can be accurately determined.

Having now described the means by which the objects of the invention are obtained, I claim:

1. In an apparatus for the electrical separation of emulsions having container means forming horizontally extending pretreatment, separation and after-treatment zones, electrodes in some of said zones, and liquid inlet means in said container means for supplying liquid to said pretreatment zone, the improvement comprising a plurality of tubular hollow prismatic bodies mounted in spaced rows in said container means with their longitudinal central axes parallel to the longitudinal axis of the container means, openings in the lower bases of said bodies for the discharge of separated media into electrical current-free areas between said rows and extending vertically between said bodies, high voltage electrodes extending within said bodies parallel to the axis thereof in said pretreatment and after-treatment zones, and perforate spacer means at the liquid inlet end of said pretreatment zone forming a partition, the inlet ends of said tubular hollow bodies being secured to said spacer means in alignment with, and in continuity with the perforations therein, whereby a flow of liquid is supplied only into the interior of each body and said bodies are stacked in rows and spaced from one another.

2. In an apparatus as in claim 1, further comprising high voltage electrodes extending within said bodies only in said pretreatment and after-treatment zones.

3. In an apparatus as in claim 2, further comprising closure members in the emulsion inlet ends of said bodies for forming narrow slit openings into said bodies.

4. In an apparatus as in claim 3, said pretreatment and separation zones being filled with said bodies having a length at least equal to the total length of the pretreatment and separation zones, and said high voltage electrodes extending only partly into the emulsion inlet ends of said bodies.

5. In an apparatus as in claim 4, said spacer means comprising a spacer sheet having the ends of said bodies projecting therethrough, said body ends being rebent and leaded-in against the spacer sheet.

6. In an apparatus as in claim 4, said spacer means comprising rectangular collars secured to the ends of the prismatic bodies.

7. In an apparatus as in claim 6, the length of said pretreatment zone being shorter than the length of said separation zone.

References Cited by the Examiner

UNITED STATES PATENTS

| 1,559,035 | 10/25 | Egloff | 204—302 |
| 2,681,311 | 6/54 | De Wit | 204—302 |
| 2,823,181 | 2/58 | Packie | 204—302 |
| 2,846,389 | 8/58 | Downing | 204—302 |

FOREIGN PATENTS 554,301   3/58   Canada.

JOHN H. MACK, *Primary Examiner.*

MURRAY TILLMAN, *Examiner.*